(12) United States Patent
Archer

(10) Patent No.: US 7,820,222 B2
(45) Date of Patent: Oct. 26, 2010

(54) ORGANIC, ERGOGENIC, ISOTONIC SOFT DRINK COMPOSITION

(76) Inventor: Oswald Michael Archer, Post Office Box F-42219, Freeport, Grand Bahama (BS)

( * ) Notice: Subject to any disclaimer, the term of this patent is extended or adjusted under 35 U.S.C. 154(b) by 853 days.

(21) Appl. No.: 11/295,395

(22) Filed: Dec. 6, 2005

(65) Prior Publication Data

US 2007/0128329 A1 Jun. 7, 2007

(51) Int. Cl.
*A23F 3/00* (2006.01)

(52) U.S. Cl. .................. 426/597; 426/590; 424/774

(58) Field of Classification Search ................. 426/590, 426/597
See application file for complete search history.

(56) References Cited

U.S. PATENT DOCUMENTS

| | | | |
|---|---|---|---|
| 5,529,796 A | | 6/1996 | Gobbo et al. |
| 5,941,409 A | * | 8/1999 | Leaderman .................. 220/717 |
| 6,261,589 B1 | | 7/2001 | Pearson et al. |
| 6,616,950 B2 | | 9/2003 | Pushpangadan et al. |

FOREIGN PATENT DOCUMENTS

EP 1421859 * 5/2004

OTHER PUBLICATIONS

HealthTree. Lemon-Ginger Tea. http://web.archive.org/web/20050319134935/http://www.ihealthtree.com/lemon-ginger-16-bags-yogi-tea-company.html. Mar. 2005.*
Asenjo. Is Caffeine Making Me Tired? Jun. 2001. http://www.consideration.org/asenjo/caffeinemakingmetired.html.*
THe Impact of an Ergogenic Drink on Performance During Continuous Endurance Exercise. Wind Gain vs. Gatorade. Department of Exercise and Sports Science, University of Miami. No date provided (reference submitted by Applicant Oct. 15, 2008).*
Yogi Tea Website. Oct. 2005. http://web.archive.org/web/20051024072057/www.goldentemple.nl/yogitea_gb/AyurvedicTeas/GingerLemon.html.*
Ginger Lemon Tea Slumped in the Valley of Fatigue . . . The Boston Globe. Feb. 26, 1998. First 5 lines of the article.*

* cited by examiner

*Primary Examiner*—Anthony Weier

(57) ABSTRACT

The present invention relates to an organic, ergogenic, isotonic soft drink, composition causing and energy enhancing internally soothing effect: comprising a brewed extract from leaves of *Cymbopogon Citratus*, and of Ginger, and of Peppermint, Sugar or other sweeteners and optionally, other flavors and purified water and a method of producing the soft drink composition; which drink imbibed produces in the imbiber an energy, internally soothing effect which includes stimulation of mitochondrial efficiency in the digestive organs, and enhancement of a more efficient intake of oxygen into the user's body.

5 Claims, No Drawings

ORGANIC, ERGOGENIC, ISOTONIC SOFT DRINK COMPOSITION

FEDERALLY SPONSORED RESEARCH

Not Applicable

SEQUENCE LISTING PR PROGRAM

Not Applicable

BACKGROUND OF THE INVENTION

1. Field of the Invention

This invention relates to brewed, soft drink beverages, specifically to organic, ergogenic, isotonic soft drink composition with energy enhancing and therapeutic characteristics.

2. Description of the Background

There is a most common complaint voiced by persons engaged in sports or other extensive physical activities, and persons not engaged in much physical activities, of a lack of physical energy. There is also an acute deficiency of normal oxygen intake by athletes during athletic competition in warm and humid conditions. Soft drinks marketed to address the above mentioned conditions have proven inadequate to address these conditions and many of the new soft drinks are mere chemical concoctions. The sport drinks are only marginally more effective than water, and at college football games on many sidelines huge outdoor fans are used for blowing refrigeration cooled mist on the athletes to keep those athletes cool and hydrated. Whenever athletes are totally "winded", oxygen masks are placed on their faces and pure oxygen is administered to them.

Generally, countless persons, from infants to the elderly, suffer indigestion and defiencies in intestinal functions. Because the intestines play such a major role in physical and mental health and well being, any malfunction in the digestive system may create many adverse kinds of physical and sometimes mental problems, such a fatigue, stomach pains, headaches and other discomfiting conditions, including flatulence; that uncomfortable windy condition experienced in the abdominal area, which is due to gases generated mostly in weak stomach an intestines.

Fatigue, weariness, chronic tiredness are all descriptive of the physical condition of lack of energy referred to as 'chronic fatigue syndrome". In U.S. Pat. No. 6,262,589 issued Jul. 17, 2001 to Pearson, et al'; it is intimated that a shortage of essential nutrient enzyme co-factors that are necessary for the production of noradrenaline and dopamime results in chronic tiredness. It appears that the condition of chronic tiredness still persist in the United States of America, and elsewhere, in spite of U.S. Pat. No. 4,624,852 issued to Wurtmam; the product PMS Escape of Inter Nutria, Inc., and the Soft Drink of the U.S. Pat. No. 6,262,589 issued to Person, et al., because the problem of chronic tiredness in reality appears to be another problem related to malfunctioning of the digestive system and low mitochondrial efficiency, which condition increases oxidative stress, which condition in turn, elevates the rating of perceived exertion (RPE).

The organic ergogenic, isotonic soft drink of the present invention presents a product that is a ready to use composition which will provide alimentative relief in the aforementioned problem areas.

SUMMARY OF THE INVENTION

An object of the present invention is to provide a composition of a natural organic product and method of preparing and administering this natural organic product that persons of both genders and any age will have the opportunity of introducing into their bodies, nutrients that will enable their bodily organs to operate effectively and efficiently.

Another objective is to provide this natural organic product as an inexpensive, nonprescription, pleasant tasting solution that can be accessed in the form of a soft drink.

Another objective is to provide this natural organic product that would positively effect mitochondrial efficiency thereby enhancing effective digestion and distribution of nutrition throughout the body.

The ability of the present invention to accomplish the objectives described above, and other objectives such as perceived energy enhancement, exist because the composition and method used to provide the organic, ergogenic soft drink of this invention comprised a brew in which compounds and chemicals such as glutathione (GSH), Nitric Oxide (NoO, Cysteine, Glycine, ADP (Adenosine Diphosphate and ATP (Adenosine Triphospate) derived from the brewing of leaves of *Cymbopogon Citratus* in purified water, combined with Peppermint, Ginger, sugar or other sweeteners and optionally other flavors, results in the soft drink product of this invention which when imbibed causes an energizing, therapeutic effect in the imbiber's physical structure.

DETAILED DESCRIPTION

Preferred Embodiment

A ration of approximately two (2) gallons of purified water is pored into a stainless steel vessel capable to containing at least twelve (12) gallons of liquid. Vessel with two (2) gallons of purified water is placed on a stove or other adequate heating device is applied and the water is brought to a boil at 212 degrees Fahrenheit.

Approximately thirty two (32) ounces of washed leaves of *Cymbopogon Citratus* also known as Lemon Grass of Fever Grass, is added to the two (2) gallons of boiling purified water and a further two (2) gallons purified water is added to the water and leaves in the stainless steel vessel. The composition is brought to a boil at 212 degrees Fahrenheit and maintained at that boiling condition for approximately 25 minutes. This process of adding two (2) gallons of purified water into the contents in the stainless steel vessel and allowing the contents to boil at 212 degrees Fahrenheit approximately 25 minutes is repeated three more times.

After the *Cymbopogon Citratus* leaves has been brewed at temperatures ranging alternately from 145 to 212 degrees Fahrenheit for a period of approximately two and one half hours, the leaves are taken out of the brewed liquid and the, approximately 10 gallons of brewed liquid remaining in the stainless steel vessel is brought to, and maintained at, a temperature of approximately 185 degrees Fahrenheit for approximately 60 minutes for purposes of pasteurizing the brewed liquid.

After pasteurization, the brewed liquid still in the stainless steel vessel is cooled to a temperature of approximately 140 degrees to 110 degrees Fahrenheit at which range of temperature the additives of approximately 88 ounces of sugar, or equivalent sweetener, is mixed into the brewed liquid, after which approximately 120 milliliters of Peppermint, approximately 30 milliliters of Ginger, and optionally other flavors, such as mango, and guarana are added to the brewed liquid and the composition is vigorously stirred until the ingredients are totally mixed resulting in the sofr5 drink invention.

Operation-Preferred Embodiment

The blood that circulates through the vessels of the digestive system contains an acidic alkali balance. This balance must be maintained if food is to move effectively and efficiently through the digestive tract.

The imbibing of as little as an 8 ounce serving of this soft drink invention by enabling more efficient peristaltic contractions of the Esophagus, enhances the through digestion of food, and the ability of mitochondria to convey the nutritious elements of the digested food, through the distributive means of the blood flowing through the intestines an the stomach, to be carried to the various parts of the body.

While I believe that that erogenic energy enhancing, therapeutic effects of the soft drink invention occurs, because of the ability of the properties of the *Cymbopogon Citratus* to stimulate mitochondrial production and increase efficiency, which should result in an increased CHO uptake by the muscle cells and production of antioxidative effects, thereby increasing Nitric Oxide (NO) production and antinociceptive effects; which could in turn, reduce perceived levels of fatigue, thereby improving physical performances; I do not wish to be bound by this belief.

The other ingredients of this soft drink invention also contain properties which enhances the effectiveness of the properties of *Cymbopogon Citratus* such as Peppermint, of which, the major constituents is Menthol. Menthol, a volatile compound, is quickly absorbed in the tissues, and one of the beneficial results of the ingestion of this compound is a relaxation of the cardio-esophageal sphincter. Peppermint also has a soothing effect on the intestines.

Another ingredient is Ginger, which has a long tr5adition of being most useful is alleviating symptoms of gastrointestinal distress; including such severe conditions of nausea and vomiting typical of pregnancy.

Thus, the reader will see that the, organic, isotonic, ergogenic, therapeutic soft drink composition of the invention provides a highly effective, yet inexpensive product that can be safely used by persons of any age.

While my above descriptions contain several specificities, these specificities should not be considered as limitations on the scope of the invention, but rather as an exemplification of one preferred embodiment thereof. Many other variations are possible. Accordingly, please allow the scope of this invention to be determined not by any embodiment illustrated, but instead, by the appended claims and their legal equivalents.

What is claimed is:

1. An organic, ergogenic, isotonic brewed soft drink composition with energy enhancing and therapeutic characteristics, comprising:

a. A ratio of approximately 32 ounces of leaves of a *Cymbopogan Citratus* plant, which plant is also known as Lemon Grass or Fever Grass b. Liquid Essence of Peppermint of approximately 120 milliliters c. Liquid Essence of Ginger of approximately 30 milliliters d. Sugar of approximately 88 ounces f. Optionally, other flavors e. Purified water of approximately 10 gallons The *Citratus* leaves are boiled in the purified water in a stainless steel vessel, at temperatures ranging alternatively from 156 to 212 degree Fahrenheit, for a period of approximately 2½ hours after which time the *Citratus* leaves are taken out of the liquid brewed from *Citratus* plant leaves, the brewed liquid is then brought to a temperature of approximately 185 degrees Fahrenheit and maintained at that said 185 degrees temperature for a period of approximately 60 minutes for purposes of pasteurization of the brewed liquid. After the pasteurization process, the brewed liquid is cooled to a temperature of approximately 140 degrees Fahrenheit, at which temperature the additives of Sugar, Essence of Peppermint, Essence of Ginger, and optionally, other flavors, are added to the said brewed liquid; which composition is vigorously mixed for a period of 3-4 minutes, and after further cooling, packaged for use.

2. An organic, ergogenic, isotonic brewed soft drink composition, with energy enhancing and therapeutic characteristics, prepared by the process of claim 1, wherein the effect of imbibing as little as 8 ounces of the said drink, activates the drinker's mitochondrial efficiency, and creates in the drinker's breathing system a more efficient intake of oxygen.

3. An organic, ergogenic, isotonic brewed soft drink composition, with energy enhancing and therapeutic characteristics, prepared by the process of claim 1, wherein the effect of imbibing as little as 8 ounces of the said drink, reduces a perceived level of fatigue in a drinker, who is participating especially in strenuous physical exertion.

4. An organic, ergogenic, isotonic brewed soft drink composition, with energy enhancing and therapeutic characteristics, prepared by the process of claim 1, wherein the effect of imbibing as little as 8 ounces of the said drink, relaxes the drinker's esophagus and enhances efficient rhythmic peristaltic contractions of the small intestines.

5. An organic, ergogenic, isotonic brewed soft drink composition, with energy enhancing and therapeutic characteristics, prepared by the process of claim 1, wherein the effect of imbibing as little as 8 ounces of the said drink, increases the effective functioning of the drinker's digestive system.

\* \* \* \* \*